(12) United States Patent
Krishnamurthy

(10) Patent No.: US 8,527,504 B1
(45) Date of Patent: Sep. 3, 2013

(54) DATA NETWORK CONTENT FILTERING USING CATEGORIZED FILTERING PARAMETERS

(75) Inventor: Balachander Krishnamurthy, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1624 days.

(21) Appl. No.: 11/409,123

(22) Filed: Apr. 21, 2006

Related U.S. Application Data

(60) Provisional application No. 60/713,409, filed on Sep. 1, 2005.

(51) Int. Cl.
G06F 7/00 (2006.01)
G06F 17/30 (2006.01)

(52) U.S. Cl.
USPC .......................................................... 707/722

(58) Field of Classification Search
None
See application file for complete search history.

(56) References Cited

U.S. PATENT DOCUMENTS

| | | | |
|---|---|---|---|
| 7,665,086 B2 * | 2/2010 | Cope et al. ................. | 717/174 |
| 2002/0161646 A1 * | 10/2002 | Gailey et al. .............. | 705/14 |
| 2003/0037041 A1 * | 2/2003 | Hertz .......................... | 707/1 |
| 2003/0110272 A1 * | 6/2003 | du Castel et al. ......... | 709/229 |
| 2004/0019523 A1 * | 1/2004 | Barry et al. ................. | 705/14 |
| 2006/0074751 A1 * | 4/2006 | Kline et al. ................. | 705/14 |
| 2007/0136136 A1 * | 6/2007 | Nossik ......................... | 705/14 |
| 2008/0005282 A1 * | 1/2008 | Gaedcke ..................... | 709/219 |
| 2008/0215563 A1 * | 9/2008 | Shi et al. .................... | 707/5 |
| 2009/0198566 A1 * | 8/2009 | Greenberg ................. | 705/10 |

OTHER PUBLICATIONS

Welcome to http://www.pierceive.com, the official home of Filterset. G, http://www.pierceive com, downloaded Apr. 4, 2006.
The Adblock Project, http://adblock.mozdev.org, downloaded Apr. 4, 2006.
Bugmenot.com—login with these free Web Passwords to Bypass Compulsory Registration, http://www.bugmenot.com, downloaded Apr. 4, 2006.

* cited by examiner

Primary Examiner — Cheryl Lewis
Assistant Examiner — Raheem Hoffler
(74) Attorney, Agent, or Firm — Wolf & Samson, PC

(57) ABSTRACT

Disclosed is a method and apparatus for filtering data network content using categorized filtering parameters. Filtering parameters (e.g., regular expressions) are categorized and stored in a database accessible by a plurality of users. A user may receive one or more categories of filtering parameters from the database, and then use the categorized filtering parameters to filter content received from a data network. A user may also contribute developed categorized filtering parameters to the database. In one advantageous embodiment, the filtering parameters are designed to filter out advertising content. In such an embodiment, the received content comprises advertising and is filtered using the categorized filtering parameters. A webpage is then rendered using the filtered content such that at least a portion of the advertising is not displayed in the webpage. The categorized filtering parameters stored in the database may be further divided into sub-categories such that the filtering parameters are stored in a hierarchical manner such that a category includes one or more sub-categories.

10 Claims, 3 Drawing Sheets

DATA NETWORK CONTENT FILTERING USING CATEGORIZED FILTERING PARAMETERS

This application claims the benefit of U.S. Provisional Application No. 60/713,409 filed Sep. 1, 2005, which is incorporated herein by reference.

BACKGROUND OF THE INVENTION

The present invention relates generally to data network content delivery, and more particularly to content filtering using categorized filtering parameters.

Content delivery via data networks is becoming increasingly popular. One such data network, the Internet, has become a popular means for users to access information on various topics of interest. There are numerous content providers disseminating information via the Internet on various subjects. For example, there are content providers providing information on sports, news, finance, science, entertainment, etc. The content providers make this information available to users via websites, and end users access the information using web browsers. So-called "web surfing" of websites using an Internet browser is well known in the art.

In addition to the basic content, many websites also contain extraneous content, often in the form of advertising. From the content provider's perspective, advertising is desirable because it generates revenue for the content provider. Advertisers are willing to pay significant advertising fees to the more popular websites. However, from the end user's perspective, advertising is unnecessary (and often unwanted) information being displayed on the user's computer. In addition to merely being unnecessary or unwanted, advertising content may have deleterious effects on the user's web browsing experience. For example, advertising content often consists of graphics and animation, which wastes the user's bandwidth and may slow down the delivery of the desired content. Also, the complexity of some advertising content requires additional processing by the user's web browser, which delays the display of the webpage at the user's computer.

A webpage may contain various types of advertising. One type is an inline advertisement in which the content provider inserts advertising content into the webpage. Another type of advertising is interstitial advertising, in which an advertisement page is shown before the actual requested content page. A user generally must view the interstitial page for a period of time before the requested content is delivered or displayed. Another type of advertising is called outsourced advertising, in which a webpage has a reference to a third party web server and the user's web browser requests and retrieves the advertisement from the third party web server. Regardless of the type of advertising, users generally may prefer to view content without such extraneous content.

There have been various attempts by users to block advertising from websites. One such attempt is the use of a browser plug-in to filter out advertising. A browser plug-in is additional software that may be installed on a computer that adds functionality to the basic browser. For example, the Firefox web browser has an available plug-in called Adblock. The Adblock plug-in allows a user to specify a set of pattern rules, each of which can either be a literal match along with the wildcard "h", or can be a full regular expression. The uniform resource locators (URLs) of all objects to be retrieved by the browser are compared against these rules and if a match occurs then the object is either not retrieved or not rendered by the browser. While a user of the Adblock plug-in may define his/her own rules for filtering, there has also been developed a set of rules (called Filterset.G) that may be shared among users. This large rule set has been developed by incorporating input from multiple users. The rule set is one large generic set of rules, which may be downloaded and used by users of the Adblock browser plug-in.

There are several problems with the use of a filter set as described above. One such problem is the risk of over coverage and resulting false positives. Since it is not possible to create rules that will perfectly filter out unwanted advertising while allowing all desired content to be rendered, there is the danger of certain rules filtering out desired content (i.e., false positives). The more rules in the filter set, the greater the danger of such over coverage and false positives. For example, a rule A, which was developed by a user that often browses news sites, may work fine for filtering content from news sites. However, when a user that browses sports sites uses that same rule, it may incorrectly filter out wanted content, thus resulting in a false positive.

Another problem with the use of a filter set as described above is the time it takes for a user's browser to apply a large set of filter rules. Each rule in the rule set must be applied against the webpage being requested. The application of a large number of rules may significantly delay the time it takes for the browser to retrieve and render the requested webpage. The use of a single large rule set may result in the application of irrelevant rules for a particular users. For example, the rule set may contain numerous rules which are useful in filtering advertisements from sports websites. However, the use of this rule set by a user that never browses sports sites will merely result in additional processing delay, without providing any additional benefit.

Thus, while the use of a browser plug-in to filter out advertising is beneficial in many respects, the use of a large generic rule filter set often results in over coverage and processing delays for the user.

BRIEF SUMMARY OF THE INVENTION

The present invention provides various techniques for filtering data network content using categorized filtering parameters.

In accordance with various embodiments of the invention, filtering parameters are categorized and stored in a database accessible by a plurality of users. A user may retrieve one or more categories of filtering parameters from the database and then use the received categorized filtering parameters to filter content received from a data network. In one advantageous embodiment, the filtering parameters are designed to filter out advertising content. In such an embodiment, the received content comprises advertising and is filtered using the categorized filtering parameters. A webpage is then rendered using the filtered content such that at least a portion of the advertising is not displayed to the user.

A user may request particular categories of filtering parameters so that each user may tailor his/her filtering parameters based on content of interest to the user. By allowing each user to narrowly tailor the filtering parameters, the prior art problems that resulted from the sharing of a single, large, generic filtering rule set are solved.

As users develop their own sets of filtering parameters, the users may upload these filtering parameters into a database so that other users may access and share the filtering parameters. The categorized filtering parameters stored in the database may be further divided into sub-categories such that the filtering parameters are stored in a hierarchical manner where categories may include one or more sub-categories. One advantage of the present invention is that the collective actions of different users viewing the same category of websites will result in highly tailored filtering parameters for that category.

These and other advantages of the invention will be apparent to those of ordinary skill in the art by reference to the following detailed description and the accompanying drawings.

DETAILED DESCRIPTION

Figure 1:
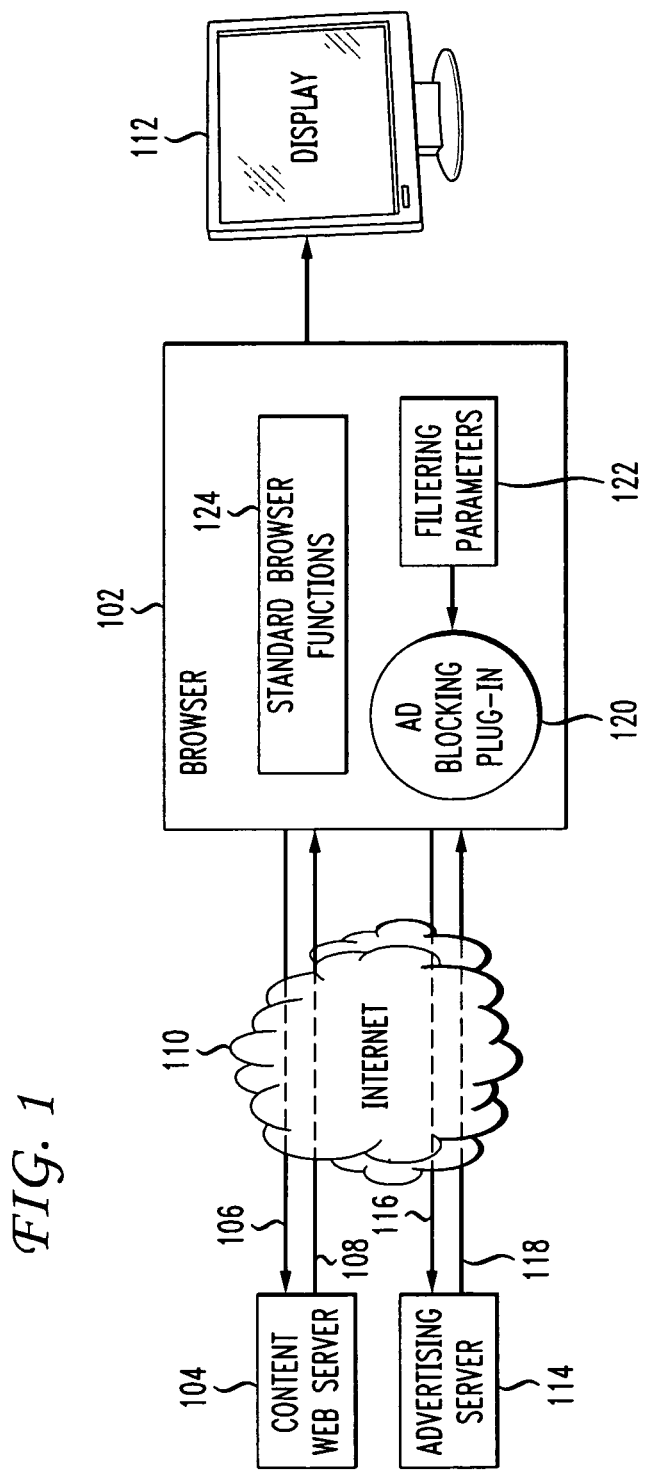
FIG. 1 represents a web browser filtering data network content.

FIG. 1 represents a web browser (which may be executing on a user computer) filtering data network content. The browser 102 may be any type of web browser capable of making requests for content and receiving content via a data network. For example, and without limitation, web browser 102 may be implemented using well known web browsers such as Microsoft Internet Explorer, Netscape Navigator, or Firefox.

As is well known, browser 102 sends requests 106 for content 108 to a content web server 104 via a data network 110, for example the Internet. The content web server 104 responds with the requested content 108. The browser 102 renders the received content and displays the rendered content on a computer display 112 for viewing by a user. This well known and standard browser functionality is represented generally in FIG. 1 as 124.

The request for information sent by a browser is generally in the form of a Uniform Resource Locator (URL) which identifies a web server and a particular web page stored on that server. For example, a URL may be: http://www.servername.com/webpage.html. The first part of the URL indicates the protocol. In the example, the protocol is the HyperText Transfer Protocol (HTTP). The URL then specifies the network address (e.g. Internet Protocol (IP) address) of the server. In the example, the network address is www.servername.com. The last part of the address specifies the particular webpage or other resources stored on the server. In the example, the resource is a web page (webpage.html). URL's, HTTP, and HTML (Hyper Text Markup Language) are all well known in the art and will not be described in further detail herein.

As is well known, as part of the HTTP protocol, received content may contain a URL reference to additional content which is to be retrieved by the browser 102. This content may be desired by the user, or it may be extraneous (e.g., advertising content) content. For example, as shown in FIG. 1, the content 108 may contain a URL. Upon receipt of such a URL as part of content 108, the browser 102 will send another request via the Internet 110 to retrieve the referenced content. In one case, the additional content may be stored on another server. For example, if the additional content is advertising, then the reference may be to an advertising server 114. As shown in FIG. 1, upon receipt of the reference as part of content 108, the browser 102 will transmit another request 116 for the advertisement, and the advertising server 114 will deliver the advertisement 118 to the browser 102 for rendering and display on display 112. Alternatively, the additional content may reside on the original content server 104, in which case the reference to additional content will result in the browser 102 making another request (not shown) for the additional content to the content web server 104. Generally, advertising content is included in a web page as a URL reference to additional content requiring a separate request by the browser 102. This URL may reference the original content server, a dedicated advertising server, or other server.

Browser 102 supports the use of plug-ins. A plug-in is software which may be installed onto the user's computer that adds functionality to the basic browser. Browser 102 includes ad blocking plug-in 120 which is used to filter received content. Plug-in 120 uses a set of filtering parameters 122 to perform filtering on received content. The uniform resource locators (URLs) of all objects to be retrieved by the browser are compared against these filtering parameters and if a match occurs then the object is either not retrieved or not rendered by the browser. For example, as described above the content 108 received from content web server 104 may contain a reference (in the form of a URL) to advertising stored on advertising server 114. Upon receipt of the content at the browser 102, the ad blocking plug-in 120 will compare the reference URL against the filtering parameters 122. If there is a match, then either 1) the ad blocking plug-in 120 will cause the browser 102 to not request the advertising from the advertising server 114, or 2) the ad blocking plug-in 120 will allow the browser 102 to request (116) and receive (118) the advertising content from advertising server 114, but will block the rendering of the advertising content. In either alternative, the result is that the advertising content is not displayed on user display 112. In one particular embodiment, the ad blocking plug-in may be implemented using the Adblock plug-in available for the Firefox Web Browser.

In one embodiment filtering parameters 122 are regular expressions. A regular expression is a string that describes or matches a set of strings, according to certain syntax rules. A wildcard (e.g., "*") in a regular expression can be used to match any text. For example, the regular expression "http://www.advertisingservercom/*" will match any text starting with "http://www.advertisingservercom/" and could be used as a regular expression for ad blocking plug-in 120 to match URLs identifying any web page stored on the www.advertisingserver.com web server. Another example could be "http://www.contentservercom/advertising/*" which will match an text starting with "http://www.contentserver.com/advertising/" and could be used as a regular expression for ad blocking plug-in 120 to match URLs identifying any web page stored on the www.contentserver.com web server within the "advertising" file directory.

Users develop filtering parameters 122 for use by ad blocking plug-in 120 in order to block unwanted advertising from being rendered by browser 102. While each individual user may define his/her own filtering parameters, users may also share a common set of rules. This allows each user to benefit from other user's work in developing filtering parameters. It is known in the art for users to share a single large generic rule set. However, as described above, this results in several problems. One such problem is the risk of over coverage and resulting false positives. Since it is not possible to create filtering parameters that will perfectly filter out unwanted advertising while allowing all desired content to be rendered, there is the danger of certain filtering parameters filtering out desired content (i.e., false positives). The larger the number of filtering parameters, the greater the danger of such over coverage and false positives. Another problem with the use of a single large generic rule set is the time it takes for a user's browser to apply a large number of filtering parameters. Each rule defined by the filtering parameters must be applied against the webpage being requested. The application of a large number of rules may significantly delay the time it takes for the browser to retrieve and render the requested webpage. Thus, to the extent the filtering parameters contains rules that may be irrelevant to a particular user (e.g., the rule is applicable to sports web sites, but the particular user never visits sports web sites) the evaluation of such rules results in significant processing overhead with no benefit to the user.

The present invention solves the problem of a generic set of filter rules by providing a method and apparatus for using categorized filtering parameters. Thus, in accordance with the present invention, the filtering parameters 122 are categorized, such that user's may tailor their filtering parameters 122 to meet their particular needs, while still taking advantage of filtering parameters developed by a community of users.

Figure 2:
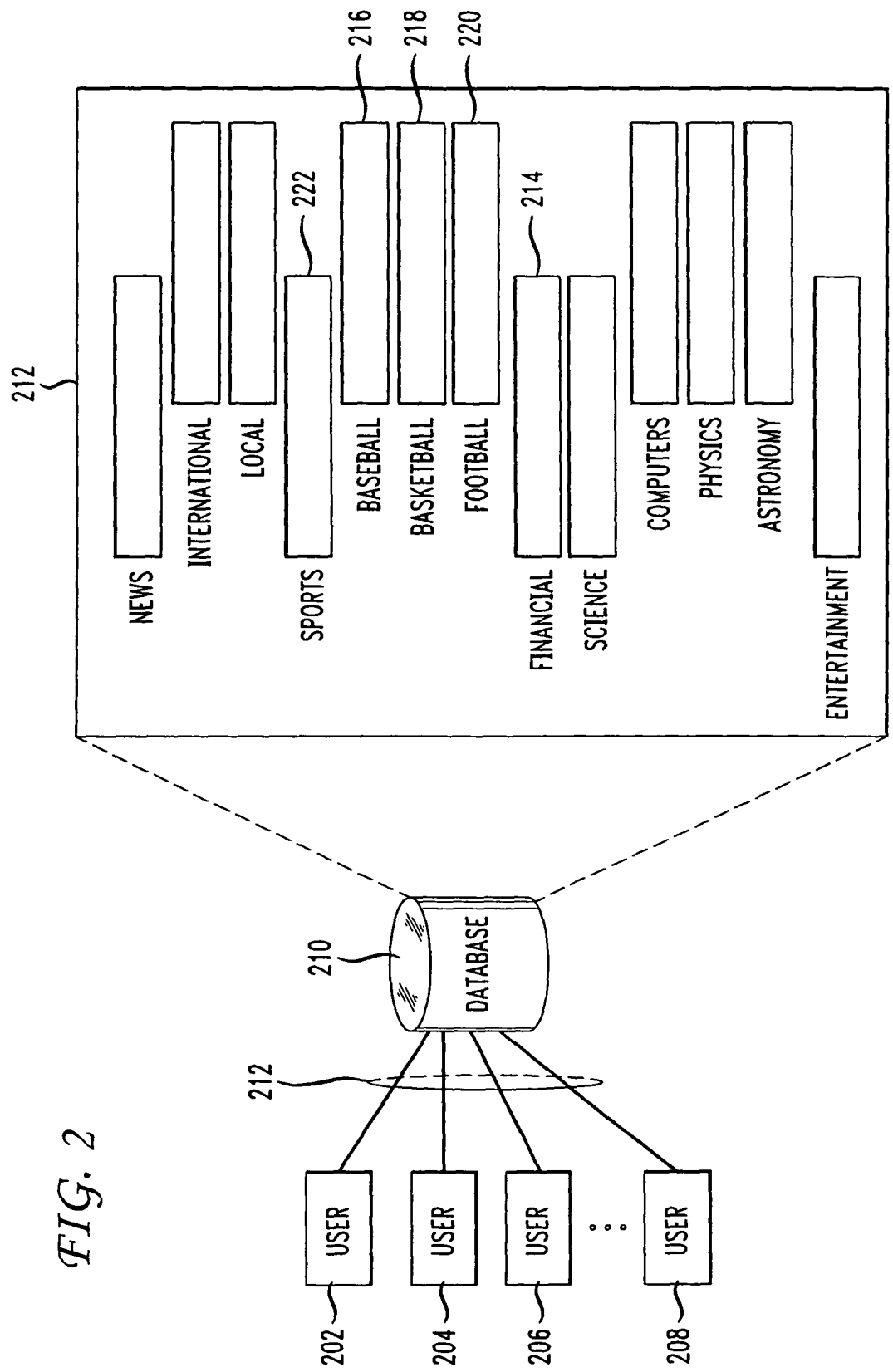
FIG. 2 illustrates users sharing categorized filtering parameters using a database.

FIG. 2 illustrates users sharing categorized filtering parameters using a database in accordance with one embodiment of the invention. FIG. 2 shows users 202—208. Each such user represents an Internet user employing web browser 102 as shown in FIG. 1. Each user is in communication with a central database 210 via communication links 212. Communication links 212 may be any type of communication link. In one example, communication links 212 represent a connection via the internet. In such an embodiment, database 210 may be implemented in a network node, such as a web server. Each user may submit filtering parameters to database 210, as well as request and receive filtering parameters from database 210. For example, consider user 202, and assume that user 202 only visits websites dealing with financial information. As such, user 202 has developed a set of filtering parameters for use by the ad blocking plug-in that effectively filter out advertising from the websites of financial information content providers. This user 202 may then share these financial website filtering parameters with other users by uploading the filtering parameters to database 210 in a well known manner. While database 210 is shown as a centralized database, it is to be understood that in various embodiments database 210 may be implemented as a distributed database.

The filtering parameters stored in database 210 are represented in FIG. 2 as 212. As shown, database 210 stores and organizes the filtering parameters and stores them as categorized filtering parameters 212 by subject matter. In one embodiment, these filtering parameters are stored as regular expressions. As shown, one category of filtering parameters is financial filtering parameters. In one embodiment, these filtering parameters 214 represent regular expressions which may be used as described above by ad blocking plug-in 120 to filter out advertisements from financial related content providers. Now, suppose that user 204 is a frequent browser of financial websites, but does not have the desire or expertise to develop a set of filtering parameters for such websites. User 204 may access database 210 and download the financial categorized filtering parameters 214 that were uploaded by user 202. For example, user 204 may send a request for the desired filtering parameters to the database 210 and the database sends the requested categorized filtering parameters to the user 204. In this manner, user 204 gets the benefit of another user's categorized filtering parameters, while being able to narrowly tailor the downloaded filtering parameters to the specific needs of user 204.

The uploading and downloading of filtering parameters by users may be accomplished by well known techniques. In one embodiment, the database 210 could be implemented as a web server and the users may browse the contents 212 of the database 210 via a web interface. The user could use the web interface to identify categories for upload and/or download.

Multiple users may also contribute to each category of filtering parameters. For example, suppose that after downloading the financial filtering parameters 214, user 204 further develops additional filtering parameters for financial websites. User 204 may then add these additional filtering parameters to financial filtering parameters 214 by uploading them to database 210.

Within each category of filtering parameters, there may be additional hierarchical levels of organization whereby categories may be further divided into multiple sub-categories related to the higher level category. For example, consider the sports category. This category may be further divided into individual related sports categories such as baseball, basketball and football. Thus, there may be categorized filtering parameters relating to baseball websites 216, basketball websites 218 and football websites 220. Thus, a user interested only in the sub-category of baseball may download only baseball categorized filtering parameters 216. Similarly, a user interested only in the sub-category of basketball may download only basketball categorized filtering parameters 218. A user interested only in the sub-category of football may download only football categorized filtering parameters 220. A user interested in all of the filtering parameters within the hierarchy may download the higher level categorized filtering parameters 222 and get all of the filtering parameters in each of the sub-categories (216, 218, 220).

A hierarchical and categorized database of filtering parameters allows users to share filtering parameters among a community of users, while still allowing each of the users to narrowly tailor their own filtering parameters depending upon the websites frequently browsed by the user. Since certain users may only browse a subset of categories, these users can tailor their filtering parameters accordingly. It should be recognized that an appropriate degree of filtering by any particular user may depend upon the processing and bandwidth capabilities of the particular user's computer. The savings realized by filtering extraneous content should be greater than the processing resources used for filtering.

Figure 3:
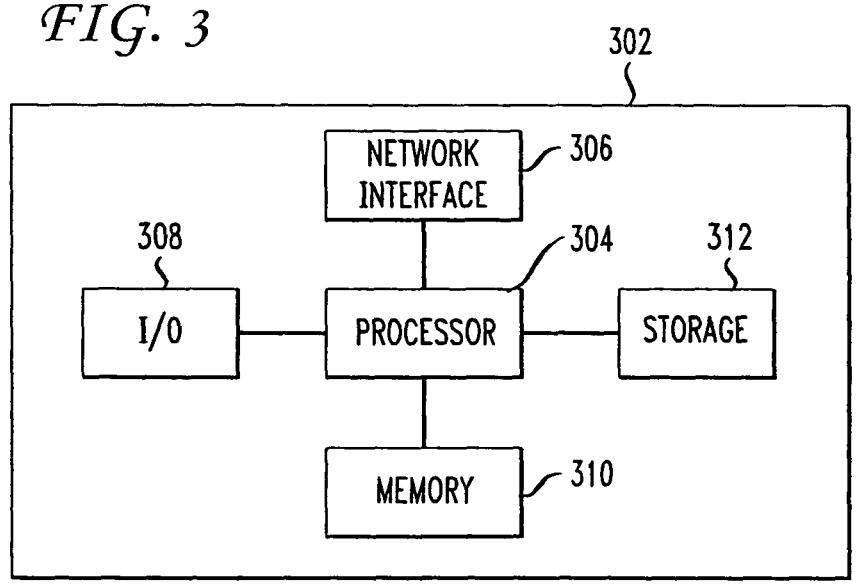
FIG. 3 shows a high level block diagram of a computer which may be used to implement certain functionality in accordance with various embodiments of the invention.

The browser 102 may be implemented using an appropriately programmed general purpose computer. Such computers executing browsers are well known in the art, and may be implemented, for example, using well known computer processors, memory units, storage devices, computer software, and other components. For example, a high level block diagram of such a computer is shown in FIG. 3. Computer 302 contains a processor 304 which controls the overall operation of computer 302 by executing computer program instructions which define such operation. The computer program instructions may be stored in a storage device 312 (e.g., magnetic disk) and loaded into memory 310 when execution of the computer program instructions is desired. Thus, the browser application will be defined by computer program instructions stored in memory 310 and/or storage 312 and the browser application will be controlled by processor 304 executing the computer program instructions. The storage 312 and memory 310 may also be used to store the categorized filtering parameters. Computer 302 also includes one or more network interfaces 306 for communicating with other devices via a network. Computer 302 also includes input/output 308 which represents devices which allow for user interaction with the computer 302 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes. Further, database 210 and user (202, 204, 206, 208) computers may also be implemented using general purpose computers. Such implementations are also well known in the art and as such will not be described in further detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for filtering content received from a data network comprising:
   transmitting, by a browser executing on a computer, a request identifying a category of filtering parameters;
   receiving a first plurality of categorized filtering parameters from a database in response to the request;
   generating an additional categorized filtering parameter;
   adding the additional categorized filtering parameter to the first plurality of categorized filtering parameters to generate a second plurality of categorized filtering parameters comprising the first plurality of categorized filtering parameters and the additional categorized filtering parameter;
   receiving content comprising a uniform resource locator associated with additional content;
   filtering the content received using the second plurality of categorized filtering parameters, wherein filtering the content received comprises comparing the uniform resource locator to the second plurality of categorized filtering parameters; and
   if a match is detected between the uniform resource locator and the second plurality of categorized filtering paramaters:
      blocking, by an ad blocking plug-in executing on the computer, a display of the additional content.

2. The method of claim 1 wherein the second plurality of categorized filtering parameters comprise regular expressions.

3. The method of claim 1 wherein the content received comprises hypertext markup language data representing a webpage.

4. The method of claim 1 wherein the second plurality of categorized filtering parameters are categorized by subject matter.

5. The method of claim 1 wherein the second plurality of categorized filtering parameters are hierarchically categorized such that a category includes one or more sub-categories.

6. The method of claim 1 wherein the content received comprises advertising and the filtering comprises removing the advertising.

7. A method for rendering a webpage comprising:
   transmitting, by a browser executing on a computer, a request identifying a category of filtering parameters;
   receiving a first plurality of categorized filtering parameters from a database in response to the request;
   generating an additional categorized filtering parameter;
   adding the additional categorized filtering parameter to the first plurality of categorized filtering parameters to generate a second plurality of categorized filtering parameters comprising the first plurality of categorized filtering parameters and the additional categorized filtering parameter;
   receiving content comprising advertising;
   filtering the content received using the second plurality of categorized filtering parameters received from the database, wherein filtering the content received comprises comparing a uniform resource locator within the content received to the second plurality of categorized filtering parameters; and
   if a match is detected between the uniform resource locator and the second plurality of categorized filtering paramaters:
      rendering a webpage using the content filtered; and
      blocking, by the ad blocking plug-in, a display of additional content associated with the uniform resource locator.

8. The method of claim 3 wherein the second plurality of categorized filtering parameters comprise regular expressions.

9. The method of claim 3 wherein the second plurality of categorized filtering parameters are categorized by subject matter.

10. The method of claim 3 wherein the second plurality of categorized filtering parameters are hierarchically categorized such that a category includes one or more sub-categories.

* * * * *

UNITED STATES PATENT AND TRADEMARK OFFICE
CERTIFICATE OF CORRECTION

PATENT NO. : 8,527,504 B1
APPLICATION NO. : 11/409123
DATED : September 3, 2013
INVENTOR(S) : Krishnamurthy Page 1 of 1

It is certified that error appears in the above-identified patent and that said Letters Patent is hereby corrected as shown below:

In the Claims

Claim 8, Line 37, "The method of claim 3 wherein" should read -- The method of claim 7 wherein --

Claim 9, Line 40, "The method of claim 3 wherein" should read -- The method of claim 7 wherein --

Claim 10, Line 43, "The method of claim 3 wherein" should read -- The method of claim 7 wherein --

Signed and Sealed this
Eleventh Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,527,504 B1  
APPLICATION NO. : 11/409123  
DATED : September 3, 2013  
INVENTOR(S) : Krishnamurthy Page 1 of 1

It is certified that error appears in the above-identified patent and that said Letters Patent is hereby corrected as shown below:

In the Claims

Column 8, Claim 8, Line 37, "The method of claim 3 wherein" should read -- The method of claim 7 wherein --

Column 8, Claim 9, Line 40, "The method of claim 3 wherein" should read -- The method of claim 7 wherein --

Column 8, Claim 10, Line 43, "The method of claim 3 wherein" should read -- The method of claim 7 wherein --

This certificate supersedes the Certificate of Correction issued February 11, 2014.

Signed and Sealed this  
Eighteenth Day of March, 2014

Michelle K. Lee  
*Deputy Director of the United States Patent and Trademark Office*